United States Patent

Davis

[15] 3,686,770
[45] Aug. 29, 1972

[54] APPARATUS FOR ALIGNING TRAILER AXLES

[72] Inventor: Lawrence D. Davis, 102 Pleasant St., Ashland, Mass. 01721

[22] Filed: July 21, 1970

[21] Appl. No.: 56,821

[52] U.S. Cl. ..................................33/193, 33/137
[51] Int. Cl. .............................................G01b 3/10
[58] Field of Search ..........33/193, 1 LE, 137, 207 A

[56] References Cited

UNITED STATES PATENTS

| | | | |
|---|---|---|---|
| 2,479,723 | 8/1949 | Brown | 33/193 |
| 2,877,560 | 3/1959 | Brown et al. | 33/193 |
| 2,627,117 | 2/1953 | Dragness | 33/137 |
| 2,711,030 | 6/1955 | Drew et al. | 33/137 |

*Primary Examiner*—William D. Martin, Jr.
*Attorney*—Kenway, Jenney & Hildreth

[57] ABSTRACT

Apparatus for aligning trailer axles without removing the wheels on the axles comprising a mounting that fits on the wheel hub cap and extends from the hub cap so that its outer end forms an unobstructed line with the trailer king pin. The outer end of each mounting has a rotatable tape mount for accommodating a measuring tape. The front trailer axle is aligned by measuring and equalizing the distance from the king pin to each outer end of the mountings on the front wheels. The aligned front axle comprises a reference line for aligning the rear axle.

8 Claims, 4 Drawing Figures

PATENTED AUG 29 1972 3,686,770
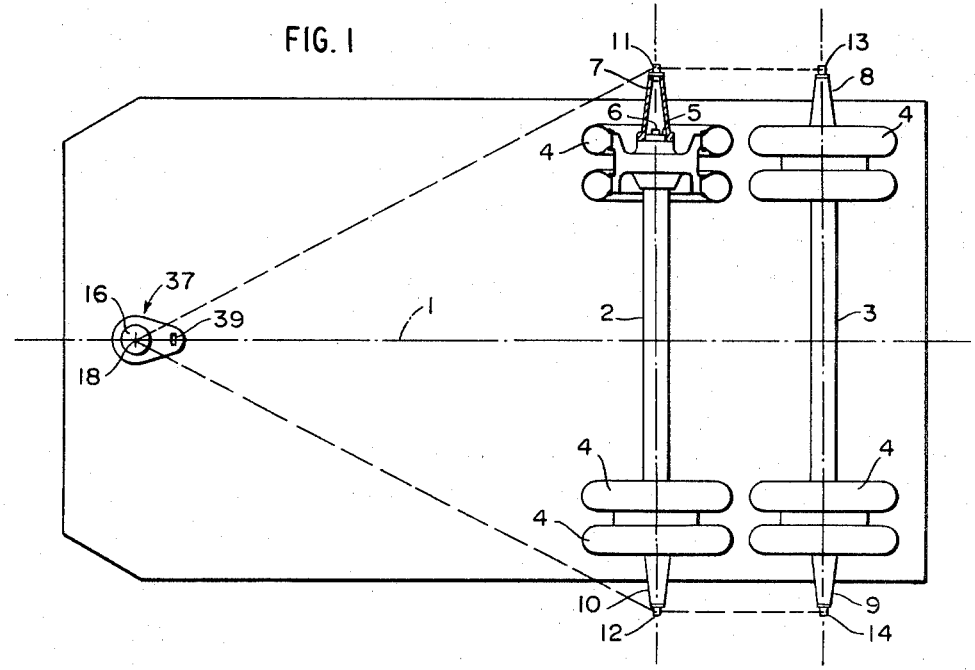
FIG. 1
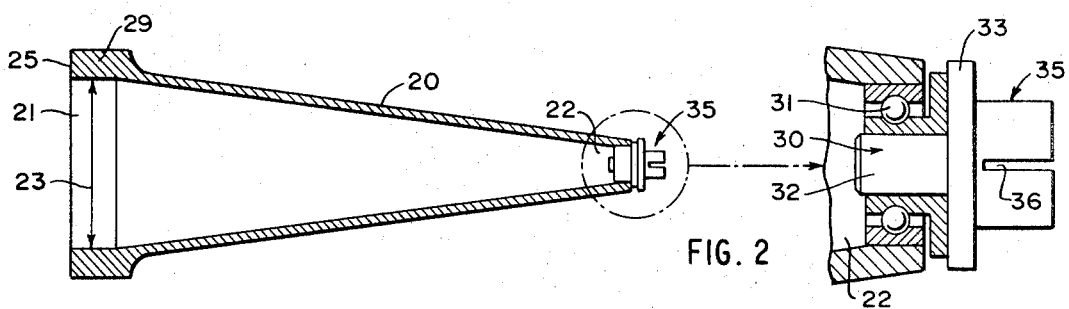
FIG. 2
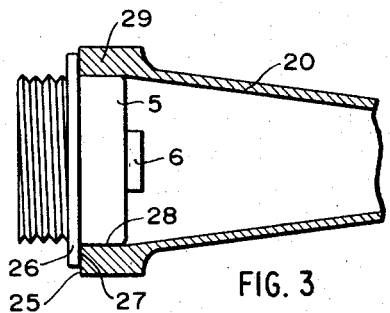
FIG. 3
FIG. 4
INVENTOR
LAWRENCE D. DAVIS
BY
Kenway, Jenney & Hildreth
ATTORNEYS

APPARATUS FOR ALIGNING TRAILER AXLES

This invention relates to an apparatus for aligning trailer axles.

Trailer axles should be aligned so that their respective centerlines form right angles with the longitudinal centerline of the trailer extending from the king pin for attaching the tractor. Proper alignment is made by measuring the distance from each end of the front trailer axle to the king pin and adjusting the axle until the two distances are equal. When the axles are improperly aligned, the tractor and trailer will be out of line thereby causing excessive wear on the trailer tires during use. Present maintenance procedures for properly aligning the trailer axles are time consuming and expensive as they involve removal of the trailer wheels in order to permit measurement from each end of the axles to the king pin. Not only is this method undesirable from the standpoint of labor cost, it is undesirable because of the recent introduction of wheel bearings employing oil rather than heavy grease. When aligning these axles, removal of the hub caps breaks the lubricant seal causing loss of lubricant and possible introduction of dirt into the bearing. It has also been suggested to employ extensions for each axle to permit the measurement without obstruction from the wheels. However, these axle extensions are not satisfactory since they either have adjustable means extending from the hub cap thereby introducing a source of error in the measurement or they require more than one person to make the appropriate measurements.

Accordingly, it would be desirable to provide an apparatus for aligning trailer axles without necessitating removal of the hub cap or wheel, does not introduce a source of error in the measurement and requires only one person to make the measurement.

The present invention provides an apparatus mountable on the trailer wheel hub cap and extending outwardly therefrom so that it is centered on the axle centerline. The mounting extends a distance from the axle so that the line from its outer extremity to the king pin is unobstructed. The length of the mounting is nonadjustable so that no error is introduced by reason of variations in hub cap dimensions or by reason of prior hub cap damage. The outer extremity of the mounting is provided with a tape mount rotatable around the axle centerline to permit an accurate measurement of the distance between the king pin and the outer extremity without bending the measuring tape while requiring only one person to measure the appropriate distances.

In use, the distances between the king pin and each of the outer extremities of the mountings on the front axle is measured and compared. One end of the tape is fixed at the king pin. This is effected conveniently by employing a king pin adapter that rotates around the centerline of the king pin. The other end of the tape is passed through a slot in the tape mount. If the two distances are different, the appropriate wheel is moved either toward or away from the king pin by conventional axle adjustment means such as an adjustable radius rod until the distances are equal. After the front axle has been aligned, the rear axle is aligned using the front axle as a reference line. The mountings are retained on the front axle and also are placed on the rear axle. One end of the tape is placed in the slot at the outer extremity of the mounting on the front axle and is passed through the slot at the outer extremity of the mounting of the rear axle on the same side of the trailer and the measurement is noted. The same measurement is taken on the other side of the trailer. The two measurements are compared and the appropriate adjustment is made on the rear axle by conventional axle adjustment means. Thus, the slot on the outer extremity of the mounting provides three important functions, namely; it prevents bending of the measuring tape while taking the measurement from the king pin to the outer extremity of the front axle, it requires only one person to make all the measurements and it provides a fixed point of reference for accommodating the measuring tape while measuring the distance between the front and rear axles.

FIG. 1 is a bottom view of a trailer with two rear axles and a king pin with the mounting means on one of the hub caps.

FIG. 2 is a cross sectional view of a mounting of this invention.

FIG. 3 is a cross sectional view of the mounting of this invention on the hub cap.

FIG. 4 is a top view of the king pin adapter that can be used in conjunction with the mountings of this invention.

Referring to FIG. 1, the angle between the longitudinal centerline 1 of the trailer and each of the axle centerlines 2 and 3 should be 90° to provide proper wheel alignment. Each of the dual wheels 4 is mounted on an axle 2 or 3 and is provided with a hub cap 5 and an oil seal 6. The mountings 7, 8, 9 and 10 each fit over the hub caps 5 without interfering with the oil seal 6 or a hubometer (not shown) that may be attached to the hub cap. Each mounting 7, 8, 9 and 10 is provided with a rotatable tape mount 11, 12, 13, and 14 at the outer ends thereof. A king pin adapter 37 is mounted over a king pin 16 and is rotatable around the vertical axis 18 of the king pin. A measuring tape can be fit into the slot 39 to measure the distances to the tape mounts 11 and 12 of the mountings 7 and 10. Means other than the slot 39 such as a hook or the like may be employed to retain and fix one end of the tape during the measurement. If desired, an attachment extending downward from the king pin 16 can be provided to avoid obstruction other than the wheels. Since the distance between the vertical centerline 18 of the king pin 16 and the slot 39 is fixed, the rotation of the king pin adapter 37 will not affect the measurement taken to the ends 11 and 12.

In use, one end of the tape is placed and fixed in slot 39 and the king pin adapter 15 is rotated while the other end of the measuring tape is placed in the slot at the tape mount 11 or 12. The measurement is noted and then the king pin adapter 37 is rotated to take the measurement at the other tape mount 11 or 12. The measurements are compared and the axle is adjusted by conventional means, not shown. After the front axle 2 has been aligned, the axle 3 is aligned using axle 2 as a reference line. One end of the tape is placed in the slot at tape mount 11 to fix the tape therein and the distance between tape mount 11 and tape mount 13 is measured. Similarly, the distance between tape mounts 12 and 14 is made. The measurements are noted and axle 3 is adjusted by conventional means, not shown.

Referring to FIG. 2 the body of the mounting comprises a hollow, generally frustoconical body 20 having both ends 21 and 22 open. End 21 has an inside diameter 23 to provide a close fit with the outside diameter of the hub cap 5. The inside surface at end 21 is shaped so that surface 25 also contacts surface 27 of flange 26. Thus, each mounting contacts common reference surfaces 27 and 28 on each wheel. Since the diameter of the hub caps having oil seals is standardized to be about 5 and ⅞ inches, the inside diameter at end 21 need not be adjustable and no other means need be provided to effect a close fit between mounting 20 hub 24 and flange 26. However, if desired, set screws through collar 29 can be provided. In any event, the outer end of the mounting is fixed and the distance between the outer end and the hub cap is the same for each wheel. The outer extremity 22 of mounting 20 has a rotatable tape mount 30 inserted therein. The tape mount 30 comprises a flanged bearing 31 to provide ease of rotation and a unitary mount 35 comprising an inner neck 32, a flange 33 and an outer neck 34 provided with a slot 36. The tape mount 30 is rotatable within bearing 31 so that slot 36 is parallel with the measuring tape thereby preventing kinks in the tape.

A suitable king pin adapter is shown in FIG. 4. The king pin adapter 37 is provided with a hole 38 to fit over and be retained on the king pin and a slot 39 to accommodate the end of the measuring tape.

I claim:

1. Apparatus for aligning an axle of a trailer having a king pin on the longitudinal centerline of the trailer comprising a mounting adapted to fit on a hub cap on and aligned with an axle, a king pin adaptor rotatably mounted on the king pin about the axis of the king pin and having means to fix a measuring tape thereto, said mounting extending outwardly from said hub cap along the longitudinal centerline of the axle so that the outer end opposite the hub cap defines an unobstructed line with the king pin adaptor, a spindle at the outer end of the mounting and rotatable therein, said spindle being centered along the longitudinal centerline of the axle and means in the spindle to accommodate a measuring tape to permit direct measurement of the distance between the king pin adaptor and the spindle.

2. Apparatus for aligning the axles of a trailer having a king pin on the longitudinal centerline of the trailer comprising a king pin adaptor rotatably mounted on the king pin about the axis of the king pin and having means to fix a measuring tape thereto, a mounting for each end of each axle, said mountings having the same length and adapted to fit around a hub cap on and aligned with an axle, each of said mountings extending outwardly from a hub cap mounted on an axle along the longitudinal centerline of the axle so that the outer end opposite the hub cap defines an unobstructed line with the king pin adaptor, a spindle at the outer end of each mounting and rotatable therein, each spindle being centered along the longitudinal centerline of an axle, and means in each spindle to accommodate a measuring tape to permit direct measurement of the distance between the king pin adaptor and the spindle.

3. The apparatus of claim 1 in combination with means to fix one end of a measuring tape at the king pin.

4. The apparatus of claim 2 in combination with means to fix one end of a measuring tape at the king pin.

5. The apparatus of claim 1 wherein the mounting is hollow, and frustoconically shaped with the spindle being fit at the apex of the frustocone.

6. The apparatus of claim 2 wherein the mountings are hollow, and frustoconically shaped with the spindle being fit at the apex of the frustocone.

7. The apparatus of claim 5 in combination with means to fix one end of a measuring tape at the king pin.

8. The apparatus of claim 6 in combination with means to fix one end of a measuring tape at the king pin.

* * * * *